(12) United States Patent
Peterson et al.

(10) Patent No.: US 6,566,152 B2
(45) Date of Patent: May 20, 2003

(54) METHOD OF FABRICATING Q-SWITCHED MICROLASERS

(75) Inventors: Brian Lee Peterson, Charlotte, NC (US); Daniel Peter Talenti, Charlotte, NC (US); Emil John Bero, Matthews, NC (US)

(73) Assignee: Litton Systems, Inc., Los Angeles, CA (US)

( * ) Notice: Subject to any disclaimer, the term of this patent is extended or adjusted under 35 U.S.C. 154(b) by 0 days.

(21) Appl. No.: 10/223,416

(22) Filed: Aug. 19, 2002

(65) Prior Publication Data

US 2003/0008427 A1 Jan. 9, 2003

Related U.S. Application Data

(60) Continuation of application No. 10/056,162, filed on Jan. 24, 2002, now Pat. No. 6,472,242, which is a division of application No. 09/337,432, filed on Jun. 21, 1999, now Pat. No. 6,377,593.

(51) Int. Cl.⁷ ............................................... H01L 21/00
(52) U.S. Cl. ....................................................... 438/27
(58) Field of Search .............................. 438/27, 29, 33, 438/22, 23–24, 34, 460

(56) References Cited

U.S. PATENT DOCUMENTS

| | | |
|---|---|---|
| 3,609,389 A | 9/1971 | Bjorkholm |
| 3,810,041 A | 5/1974 | Martin |
| 4,191,931 A | 3/1980 | Kuppenheimer |
| 4,698,816 A | 10/1987 | Chun |
| 4,894,839 A | 1/1990 | Baer |
| 4,953,166 A | 8/1990 | Mooradian |
| 5,130,995 A | 7/1992 | Grossman et al. |
| 5,305,345 A | 4/1994 | Albrecht et al. |
| 5,317,447 A | 5/1994 | Baird et al. |
| 5,394,413 A | 2/1995 | Zayhowski |
| 5,402,437 A * | 3/1995 | Mooradian ............ 372/92 |
| 5,408,480 A | 4/1995 | Hemmati |
| 5,455,838 A | 10/1995 | Heritier et al. |
| 5,463,649 A | 10/1995 | Ashby et al. |
| 5,479,430 A | 12/1995 | Shine, Jr. et al. |
| 5,488,619 A | 1/1996 | Injeyan et al. |
| 5,546,416 A | 8/1996 | Basu |
| 5,555,254 A | 9/1996 | Injeyan et al. |
| 5,610,933 A | 3/1997 | Jani et al. |
| 5,673,281 A | 9/1997 | Byer |
| 5,732,100 A | 3/1998 | Thony et al. |
| 5,832,010 A | 11/1998 | Fulbert et al. |
| 5,844,932 A | 12/1998 | Thony et al. |
| 5,991,315 A | 11/1999 | Injeyan et al. |
| 6,014,393 A | 1/2000 | Fulbert et al. |
| 6,094,447 A | 7/2000 | Drake, Jr. |
| 6,134,258 A | 10/2000 | Tulloch et al. |
| 6,219,361 B1 | 4/2001 | Guch, Jr. et al. |
| 6,240,113 B1 | 5/2001 | Peterson |
| 6,271,923 B1 | 8/2001 | Hill |
| 6,344,937 B1 | 2/2002 | Sparrold et al. |
| 6,373,865 B1 | 4/2002 | Nettleton et al. |
| 6,377,593 B1 | 4/2002 | Peterson et al. |

FOREIGN PATENT DOCUMENTS

JP 5-7046 A 1/1993

* cited by examiner

Primary Examiner—Craig Thompson
(74) Attorney, Agent, or Firm—Alston & Bird LLP

(57) ABSTRACT

A Q-switched microlaser is provided that is capable of supporting a zig-zag resonation pattern in response to side pumping of the active gain medium so as to effectively lengthen the microresonator cavity without having to physically lengthen the microresonator cavity. As such, the microlaser can generate pulses having greater pulse widths and correspondingly greater pulse energies and average power levels than the pulses provided by conventional microlasers of a similar size. corresponding fabrication method is also provided according to one embodiment of the present invention that permits a plurality of side pumped Q-switched microlasers to be fabricated in an efficient and repeatable manner.

12 Claims, 2 Drawing Sheets

ABSTRACT OMITTED—BEGIN PAGE

METHOD OF FABRICATING Q-SWITCHED MICROLASERS

CROSS-REFERENCE TO RELATED APPLICATIONS

This a is a continuation of U.S. Application No. 10/056,162, filed Jan. 24, 2002, now U.S. Pat. No. 6,472,242 which is a divisional of U.S. application Ser. No. 09/337,432, filed Jun. 21, 1999 and issued Apr. 23, 2002 as U.S. Pat. No. 6,377,593, and which are hereby incorporated herein in their entirety by reference.

FIELD OF THE INVENTION

The present invention relates generally to microlasers and associated fabrication methods and, more particularly, to side pumped Q-switched microlasers and associated fabrication methods.

BACKGROUND OF THE INVENTION

Modern electro-optical applications are demanding relatively inexpensive, miniaturized lasers capable of producing a series of well-defined output pulses. As such, a variety of microlasers have been developed which include a microresonator and a pair of at least partially reflective mirrors disposed at opposite ends of the microresonator to define a resonant cavity therebetween. The microresonator of one advantageous microlaser includes an active gain medium and a saturable absorber that serves as a Q-switch. See, for example, U.S. Pat. No. 5,394,413 to John J. Zayhowski which issued on Feb. 28, 1995, the contents of which are incorporated in their entirety herein. By appropriately pumping the active gain medium, such as with a laser diode, the microresonator will emit a series of pulses having a predetermined wavelength, pulse width and pulse energy.

As known to those skilled in the art, the wavelength of the signals emitted by a microlaser is dependent upon the materials from which the active gain medium and the saturable absorber are formed. In contrast, the pulse width of the laser pulses emitted by a conventional microlaser is proportional to the length of the resonator cavity. As such, longer resonator cavities will generally emit output pulses having greater pulse widths. Further, both the pulse energy and average power provided by a microlaser are proportional to the pulse width of the pulses output by the microlaser. All other factors being equal, the longer the microresonator cavity, the longer the pulse width and the greater the pulse energy and average power of the resulting laser pulses.

Conventional microlasers, such as those described by U.S. Pat. No. 5,394,413, are end pumped in a direction parallel to the longitudinal axis defined by the resonator cavity. In this regard, the longitudinal axis of the microresonator cavity extends lengthwise through the resonator cavity and is oriented so as to be orthogonal to the pair of at least partially reflective mirrors that define the opposed ends of the resonant cavity. As such, conventional microlasers are configured such that the pump source provides pump signals in a direction perpendicular to the at least partially reflective mirrors that define the opposed ends of the resonant cavity. The effective length of the resonator cavity is therefore equal to the physical length of the resonator cavity.

While the microlaser can be fabricated such that the resonator cavity has different lengths, a number of factors contribute to generally limit the permissible length of the resonator cavity. See, for example, U.S. Pat. No. 5,394,413 that states that the resonator cavity, including both the saturable absorber and the gain medium, is preferably less than two millimeters in length. In particular, a number of electro-optical applications require microlasers that are extremely small. As such, increases in the length of the resonator cavity are strongly discouraged in these applications since any such increases in the length of the microresonator cavity would correspondingly increase the overall size of the microlaser.

In addition, the length of passively Q-switch microlasers is effectively limited by the requirement that the inversion density must exceed a predetermined threshold before lasing commences. As the physical length of the resonator cavity increases, greater amounts of pump energy are required in order to create the necessary inversion density for lasing. In addition to disadvantageously consuming more power to pump the microlaser, the increased pumping requirements create a number of other problems, such as the creation of substantially more heat within the microlaser which must be properly disposed of in order to permit continued operation of the microlaser. In certain instances, the heat generated within the microlaser may even exceed the thermal capacity of the heat sink or other heat removal device, thereby potentially causing a catastrophic failure of the microlaser.

Since the pulse width and correspondingly the pulse energy and average power of the pulses output by a microlaser cavity are proportional to the length of the resonator cavity, the foregoing examples of practical limitations on the length of the resonator cavity also disadvantageously limit the pulse width and the corresponding pulse energy and average power of the pulses output by the conventional microlasers. However, some modern electro-optical applications are beginning to require microlasers that emit pulses having greater pulse widths, such as pulse widths of greater than 1 nanosecond and, in some instances, up to 10 nanoseconds, as well as pulses that have greater pulse energy, such as between about 10 $\mu$J and about 100 $\mu$J, and greater average power, such as between 0.1 watts and 1 watt. As a result of the foregoing limitations on the length of the resonator cavity and the corresponding limitations on the pulse widths, pulse energy and average power of the pulses output by the conventional microlasers, conventional microlasers do not appear capable of meeting these increased demands.

SUMMARY OF THE INVENTION

A microlaser is therefore provided according to one embodiment of the present invention that is capable of supporting a zig-zag resonation pattern in response to side pumping of the active gain medium so as to effectively lengthen the microresonator cavity without having to physically lengthen the microresonator cavity. As such, the microlaser of this embodiment can generate pulses having greater pulse widths and correspondingly greater pulse energies and average power levels than the pulses provided by conventional microlasers of a similar size. A corresponding fabrication method is also provided according to one embodiment of the present invention that permits a plurality of side pumped Q-switched microlasers to be fabricated in an efficient and repeatable manner.

According to the present invention, the microlaser includes a microresonator having an active gain medium and a Q-switch, such as a passive Q-switch. The microresonator extends lengthwise between opposed end faces and has a first side surface extending between the opposed end faces. The microlaser also includes first and second reflective surfaces disposed proximate respective ones of the opposed end faces to define a microresonator cavity therebetween. While the first and second reflective surfaces can be coated upon respective ones of the opposed end faces of the microresonators, the first and second reflective surfaces can also be formed by mirrors that are spaced from respective ones of the opposed end faces The microlaser can also include a pump source for introducing pump signals into the active gain medium via the first side surface of the microresonator such that the zig-zag resonation pattern is established within the microresonator cavity.

In one advantageous embodiment, the opposed end faces are each disposed at a nonorthogonal angle ∀, such as between about 300 and about 350, relative to a line perpendicular to a longitudinal axis defined by the microresonator cavity and extending between the opposed end faces. In one embodiment, the opposed end faces are each disposed at the same nonorthogonal angle ∀ relative to the longitudinal axis such that the opposed end faces are parallel. In another embodiment, the opposed end faces are oriented in opposite directions by the same nonorthogonal angle ∀ relative to the longitudinal axis. As a result of the nonorthogonal relationship of the opposed end faces to the longitudinal axis defined by the microresonator cavity, the microlaser of either embodiment is capable of supporting the zig-zag resonation pattern in response to side pumping of the active gain medium via the first side surface of the microresonator.

By supporting the zig-zag resonation pattern, the effective length of the microresonator cavity is increased relative to conventional microlasers having substantially the same physical size. In this regard, the effective length of the microresonator cavity of the present invention is the length of the zig-zag resonation path established by the microlaser which is significantly longer than the linear resonation paths established by conventional microlasers that extend parallel to the longitudinal axis of the resonator cavity. As such, the microlaser of the present invention can emit pulses having a longer pulse width and correspondingly greater pulse energies and average power levels than the pulses emitted by conventional microlasers of the same physical size.

In order to permit the pump signals to be received by the active gain medium without being reflected from the first side surface, the microlaser can include an antireflection coating on the first side surface for permitting pump signals having a predetermined range of wavelengths to be received by the active gain medium. In addition to the first side surface, the microresonator generally includes a second side surface opposite the first side surface and extending between the opposed end faces. The microlaser of this embodiment can further include a reflectance coating upon the second side surface for reflecting the pump signals, thereby insuring that the pump signals that have entered the active gain medium remain within the active gain medium. In one embodiment, the microresonator also includes third and fourth opposed side surfaces extending between the opposed end faces and between the first and second side surfaces. In order to further facilitate resonation within the microresonator cavity, the third and fourth side surfaces can be roughened, such as by grinding, to thereby diffuse light.

In order to permit the microlaser to emit signals of a predetermined lasing wavelength via one of the opposed end faces, the first reflective surface is preferably highly reflective for laser signals having the predetermined lasing wavelength. In contrast, the second reflective surface is preferably only partially reflective for laser signals having the predetermined lasing wavelength. As such, the microlaser can emit laser pulses having the predetermined lasing wavelength via the second reflective surface.

In one embodiment, the microlaser also includes a heat sink upon which the microresonator is mounted and a housing in which the microresonator and the pump source are so disposed. In this embodiment, the housing includes a window through which laser signals generated by the microresonator are emitted. In order to protect the microresonator, such as from deleterious environmental conditions, the microlaser can also include another window disposed within the housing for separating the pump source from the microresonator such that the microresonator is disposed in a portion of the housing that can be sealed.

According to another embodiment of the present invention, a method of fabricating a plurality of side pumped, passively Q-switched microlasers is provided. This method initially provides a layer of passive Q-switch material. Thereafter, the active gain medium is grown, such as by liquid phase epitaxy, upon the layer of passive Q-switch material to form a composite structure having opposed major surfaces. While the active gain medium and passive Q-switch material can be formed of a variety of materials, the method of one advantageous embodiment grows neodymium-doped yttrium aluminum garnet (YAG) upon a layer of tetravalent chrome-doped YAG that serves as the passive Q-switch material.

The resulting composite structure is then cut at a nonorthogonal angle α relative to the opposed major surfaces to thereby form the plurality of passively Q-switched microlasers. By cutting at a nonorthogonal angle α relative to the opposed major surfaces, each passively Q-switched microlaser defines a longitudinal axis and has opposed end faces that are disposed at the same nonorthogonal angle α with respect to the longitudinal axis. As such, a plurality of side pumped passively Q-switched microlasers can be fabricated according to this embodiment of the present invention in an efficient and repeatable manner.

In one advantageous embodiment, the composite structure is divided into a plurality of bars prior to cutting the composite structure at the nonorthogonal angle α. In this embodiment, each respective bar is thereafter cut at the nonorthogonal angle α relative to the opposed major surfaces to form the plurality of passively Q-switched microlasers. After cutting the composite structure at the nonorthogonal angle α, the first side surface of each microlaser can be coated with the antireflection coating to permit pump signals having a predetermined range of wavelengths to be received by the active gain medium without being reflected from the first side surface. In addition, the second side surface of each microlaser, opposite the first side surface, can be coated with a reflectance coating for internally reflecting the pump signals. Moreover, the third and fourth opposed side surfaces of each microlaser can be roughened, such as by finely grinding, to diffuse light.

Additionally, the opposed ends of the microlaser can be coated with first and second reflective surfaces, typically after cutting the composite structure at the nonorthogonal angle α. In this regard, the first reflective surface is highly reflective for signals having the predetermined lasing wavelength, while the second reflective surface is only partially reflective for signals having the predetermined lasing wavelength. As such, the resulting microlasers will advantageously be capable of supporting a zig-zag resonation pattern and of controllably emitting pulses of the predetermined lasing wavelength via the second reflective surface.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
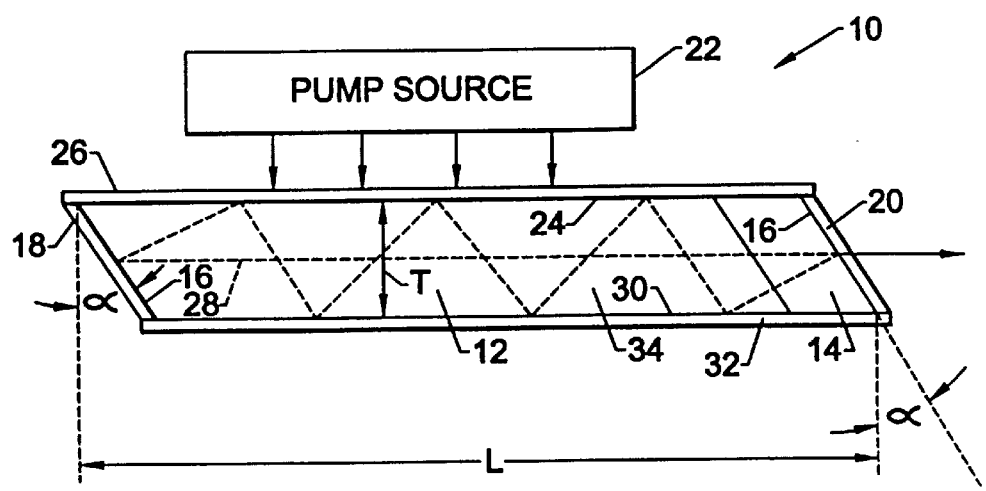
FIG. 1 is a side elevational view of a microlaser according to one advantageous embodiment of the present invention.

Referring now to FIG. 1, a microlaser 10 according to one advantageous embodiment of the present invention is illustrated. The microlaser includes a microresonator having an active gain medium 12 and a Q-switch 14, such as a passive Q-switch, immediately adjacent to the active gain medium. While the microresonator of one advantageous embodiment is fabricated by epitaxially growing the active gain medium upon the Q-switch as described below, the microresonator can be fabricated in other manners. For example, the active gain medium and the Q-switch can be joined by a diffusion bond or by optical contact in which the active gain medium and the Q-switch are attracted with coherent forces, such as Van der Waals forces. In order to securely join the active gain medium and the Q-switch by diffusion bonding or optical contact, the abutting surfaces of the active gain medium and the Q-switch must be extremely clean and flat, such as to within 1/20 of a reference wavelength, such as 633 nanometers in one exemplary embodiment Both the Q-switch 14 and the active gain medium 12 are formed of an appropriately doped host material. Typically, the host material is yttrium aluminum garnet (YAG), although materials such as yttrium vanadate ($YVO_4$) and yttrium lithium fluoride (YLF), can be employed. In addition, while a variety of dopants can be utilized, the active gain medium is typically doped with neodymium (Nd) and the saturable absorber is typically doped with tetravalent chrome. In one advantageous embodiment, for example, the active gain medium is formed of YAG that is doped with between about 2 and about 3 atomic percent of Nd. In this embodiment, the Q-switch or saturable absorber is also formed of YAG and is doped with tetravalent chrome so as to have an optical density of 0.03 to 0.1. As will be apparent, however, the active gain medium and the saturable absorber can be doped with different atomic percentages and different types of dopant without departing from the spirit and scope of the present invention.

Regardless of the material selection, the saturable absorber serves as a Q-switch to prevent the onset of lasing until the inversion density within the microresonator is sufficiently high, i.e., above a predetermined threshold. Once lasing begins, however, the microresonator will produce a series of pulses of a predetermined wavelength, i.e., the lasing wavelength, that have a predetermined pulse width, albeit a longer pulse width than the laser pulses generated by conventional microlasers.

Figure 2:
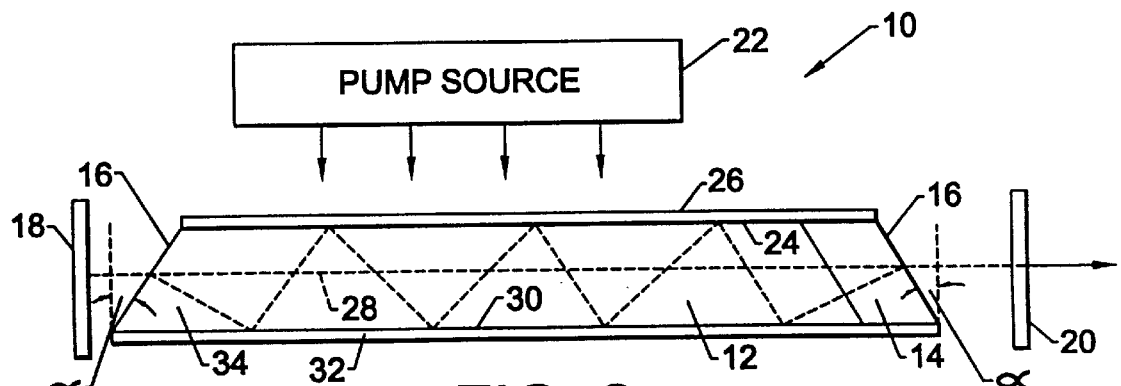
FIG. 2 is a side elevational view of a microlaser according to another embodiment of the present invention.

The microresonator extends lengthwise between opposed end faces 16. In the advantageous embodiment illustrated herein, the active gain medium 12 is proximate one of the opposed end faces and the Q-switch 14 is proximate the other end face. However, the active gain medium and the Q-switch can both extend lengthwise between the opposed end faces as described in U.S. patent application Ser. No. 09/337,716 entitled Side Pumped, Q-Switched Microlaser that is filed concurrently herewith and has now issued as U.S. Pat. No. 6,219,361, the contents of which are incorporated in their entirety herein. The microlaser 10 also includes first and second reflective surfaces 18, 20 disposed proximate respective ones of the opposed end faces to define a microresonator cavity therebetween. As shown in FIG. 1, the first and second reflective surfaces can consist of a multi-layered dielectric coating that is deposited upon the opposed end faces. Alternatively, the first and second reflective surfaces can be formed by first and second dichroic mirrors that are positioned proximate, but slightly spaced from respective ones of the opposed end faces as shown in FIG. 2.

In either embodiment, the first reflective surface 18 proximate the end face 16 of the microresonator defined by the active gain medium 12 has a high reflectivity, such as a reflectivity of greater than 99.5%, for signals having the predetermined lasing wavelength, such as 1.064 nanometers for a microlaser having an active gain medium formed of Nd doped YAG. In addition, the second reflective surface 20 that is disposed proximate the end face of the microresonator defined by the passive Q-switch 14 is a partial reflector, typically having a reflectivity of between 40% and 90% for signals having the predetermined lasing wavelengths. See also U.S. Pat. No. 5,394,413 which further describes a pair of mirrors that define the resonator cavity of a microlaser.

Once the active gain medium 12 is pumped such that the inversion density within the microresonator is above the predetermined threshold, the passive Q-switch 14 will permit a series of pulses to be emitted. As a result of the partial reflectivity of the second reflective surface 20, the series of pulses will then be emitted through the second reflective surface.

The microlaser 10 also includes a pump source 22 for pumping the active gain medium 12 with pump signals. In contrast to conventional end-pumped microlasers, the microlaser of the present invention is side pumped. In this regard, the microresonator has a first side surface 24 extending between the opposed end faces 16. By positioning the pump source such that the pump signals are delivered via the first side surface of the microresonator, the active gain medium is effectively side pumped. While the microlaser of the present invention is typically pumped via the first side surface, the microlaser can, instead, be pumped via two or more side surfaces, such as the opposed first and second side surfaces, if so desired.

Although the wavelength of the pump signals can be tailored to the specific materials that comprise the active gain medium 12, an active gain medium that is comprised of Nd doped YAG is typically pumped with pump signals having a wavelength of 808+/−3 nanometers. In order to permit the pump signals to be received by the active gain medium without being reflected from the first side surface 24, the microlaser generally includes an antireflection coating 26 deposited upon the first side surface to permit signals having the wavelength of the pump signals to enter the microresonator cavity with little, if any, reflection.

While the microlaser 10 can include a variety of pump sources 22, the microlaser of one advantageous embodiment utilizes one or more linear laser diode pump arrays that have a cumulative length that is no greater than and is typically somewhat shorter than the length of the active gain medium 12 as measured along its longitudinal axis 28. By utilizing a laser diode pump array, the energy delivered via the pump signal is increased dramatically relative to the energy provided by the pump signals of a single stripe laser diode that is typically utilized to end pump conventional microlasers. For example, a linear laser diode array having a length of about 1 cm generally provides pump signals having an average pump power of 15–40 watts, as compared to the 1–3 watts of average pump power provided by the pump signals of a single stripe laser diode.

As a result of the side pumping and the angled configuration of the end faces 16 of the microresonator as described below, the resonation pattern established by the microresonator is not parallel to the longitudinal axis 28 as is established by conventional end-pumped microlasers. Instead, the resonation pattern established by the microresonator of the present invention is a zig-zag resonation pattern as shown in dashed lines in FIGS. 1 and 2. In order to support the zig-zag resonation pattern and to prevent undesirable loss of the pump signals, a second side surface 30 of the microresonator, opposite the first side surface 24 through which the pump signals are received, is preferably coated with a reflectance coating 22 that has a high reflectivity, such as a reflectivity of greater than 99.5%, for signals having the wavelength of the pump signals. In the embodiment in which the pump source delivers pump signals having a wavelength of 808+/−3 nanometers, the second side surface of the microresonator is preferably coated with a reflectance coating that has a high reflectivity for signals having a wavelength of 808+/−3 nanometers. While the reflectance coating deposited upon the second side surface and the antireflection coating 26 deposited upon the first side surface can be formed in a variety of manners, the reflectance coating and the antireflection coating are typically formed by the deposition of a plurality of dielectric layers having respective indices of refraction that are tailored to provide the proper reflectivity properties as known to those skilled in the art.

Since the microresonator is typically an elongate bar having a generally rectangular cross-section and angled end faces 16, the microresonator also typically includes third and fourth side surfaces 34 extending between the opposed end faces and between the first and second opposed side surfaces 24, 30. In FIGS. 1 and 2, for example, the third side surface is in view while the fourth side surface faces away from the viewer and is therefore unseen. In order to prevent much, if any, light from entering or departing from the microresonator cavity via the third and fourth side surfaces, the third and fourth side surfaces are typically finely ground or otherwise roughened so as to diffuse light.

In order to support the zig-zag resonation pattern established in the microresonator cavity, the opposed end faces 16 of the microresonator are each preferably disposed at a nonorthogonal angle ∀ relative to the longitudinal axis 28 defined by the microresonator cavity. While the opposed end faces can be disposed at a variety of nonorthogonal angles ∀ relative to the longitudinal axis, the opposed end faces are typically disposed at an angle ∀ that is between about 30° and about 35° relative to a line perpendicular to the longitudinal axis and, more commonly, at an angle of about 30.9°. Typically, the angle α is defined to be equal to arcsin $$\frac{n_o}{n_r}$$

wherein $n_o$ is the index of refraction for the surrounding environment, such as 1.0 for air; and $n_r$ is the index of refraction of the active gain medium 12.

Since the resonation pattern established by the microresonator cavity is created by the total internal reflection (TIR) of the signals which, in turn, is governed by the refractive indices of the respective materials, the relationship between the thickness T, the microresonator cavity as measured between the first and second opposed side surfaces 24, 30, the length L of the microresonator cavity measured tip to tip, the angle α defined by the opposed end faces relative to the longitudinal axis of the microresonator cavity and the number N of reflections or bounces of the signals from the side surfaces of the microresonator cavity prior to emission via the second reflective surface 20 can be defined by the following equation:

$$L = \frac{NT}{\tan\alpha} + \frac{T}{\tan\alpha}$$

In addition, the length of each of the first and second sides of the microresonator cavity, i.e., the base length is defined to be equal to NT/tan α.

As shown in FIG. 1, the opposed end faces 16 can each be disposed at the same nonorthogonal angle α relative to the longitudinal axis 28 defined by the microresonator cavity such that the opposed end faces are parallel. Alternatively, the opposed end faces can be oriented in opposite directions by the same nonorthogonal angle α relative to the longitudinal axis defined by the microresonator cavity as shown in FIG. 2. In either embodiment, the resulting microresonator cavity supports the zig-zag resonation pattern as shown.

By supporting a zig-zag resonation pattern within the microresonator cavity, the effective length of the resonation pattern is significant longer than the physical length of the microresonator cavity as measured along the longitudinal axis 28. In this regard, the effective length of the resonation pattern is defined by the path of the signals as the signals alternately bounce from the opposed side surfaces of the microresonator. For a microlaser 10 that is designed such that the signals reflect or bounce four times from the opposed side surfaces of the microresonator, i.e., N=4, the effective length of the zig-zag resonation pattern is about three to four times longer than the physical length of the microresonator cavity as measured along the longitudinal axis. Since the length of the resonation pattern and the physical length of the resonator cavity are identical for conventional end-pumped microlasers, the microlaser of the present invention advantageously provides a much longer resonation pattern without requiring that physical dimensions of the microresonator be increased.

As a result of the lengthened resonation pattern, the pulse width or pulse duration of the pulses output by the microlaser 10 is increased relative to the pulse width of the pulses output by conventional microlasers of the same size. For example, the pulses output by the microlaser of the present invention are anticipated to have a pulse width of between 1 and 10 nanoseconds and, more typically, between about 2 and 5 nanoseconds, as compared to the pulses output by conventional end-pump microlasers of the same size which have subnanosecond pulse widths. In addition, the energy delivered by the pulses output by the microlaser of the present invention should be significantly greater than the energy delivered by the pulses output by conventional end-pumped microlasers of the same size. In this regard, pulses having an energy up to about 100 $\mu$J are anticipated to be emitted by the microlaser of the present invention in comparison to pulse energies of less than about 35 $\mu$J that are provided by the pulses output by conventional end-pump microlasers of the same size. Correspondingly, the pulses emitted by the microlaser of the present invention are anticipated to have much greater average powers, such as 0.1 watts to 1 watt, than the average power of conventional end-pumped microlasers that is typically less than 0.1 watts.

Figure 3:
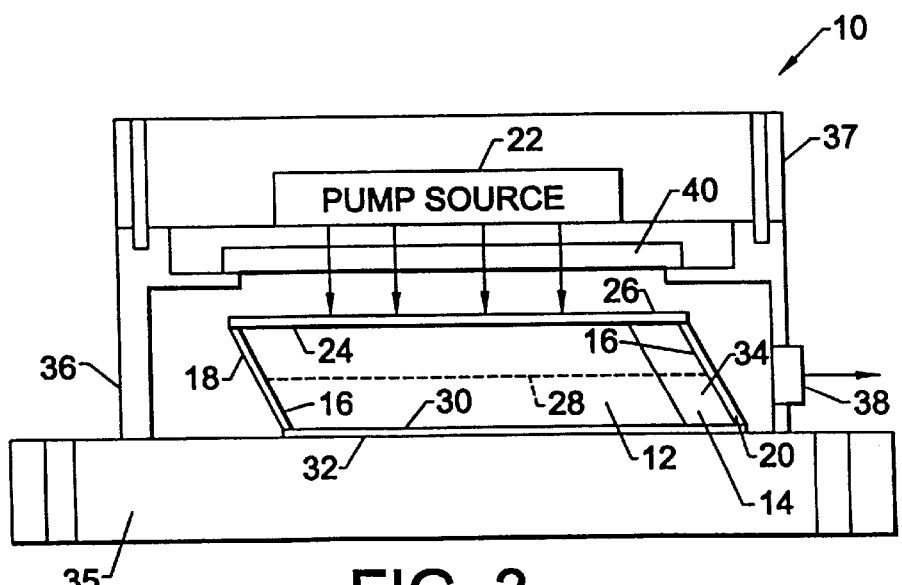
FIG. 3 is a side elevational view of a microlaser according to one embodiment of the present invention in which the microresonator and the pump source are disposed within a housing and in which a portion of the housing has been removed to permit interior portions of the housing to be depicted.

While the microlaser 10 of the present invention can be packaged in a variety of manners, a packaged microlaser according to one embodiment is illustrated in FIG. 3. As shown, the microlaser further includes a heat sink 35 upon which the microresonator is mounted. Although a variety of active and passive heat sinks can be utilized, the heat sink of one advantageous embodiment is an oxygen free high conductivity copper heat sink. Regardless of the type of heat sink, the microresonator is preferably bonded to the heat sink by means of a thermally matched epoxy, such as an aluminum oxide filled or a silver filled epoxy.

The microlaser 10 of this embodiment also includes a housing 36 in which the microresonator and the pump source 22 are disposed. While the housing can be comprised of a variety of materials, the housing may be comprised of a thermally conductive material and, in some embodiments, is comprised of the same material as the heat sink, such as oxygen free high conductivity copper, in order to facilitate transmission of the thermal energy to the heat sink for disposal.

As shown, the housing 36 includes a window 38 aligned with and typically proximate to the second reflective surface 20 through which pulses are output by the microresonator. The window is designed to be transmissive to signals having the predetermined lasing wavelength of the microresonator. As such, the pulses output by the microresonator will pass through the window with little, if any, attenuation. While the window can be constructed in a variety of manners, the window of one advantageous embodiment is comprised of sapphire and is coated with an antireflection coating that prevents little, if any, of the signals having the predetermined lasing wavelength from being reflected. As described above, the antireflection-coating is typically formed of a plurality of dielectric layers tailored to have dielectric properties that limit, if not prevent reflection of signals having the predetermined lasing wavelength. Although not necessary for the practice of the present invention, the microlaser 10 can include a partially reflective mirror (not shown) for diverting a small fraction of each output pulse to a power monitor, such as a photodetector, that monitors the output pulses so as to provide an indication if the microlaser fails to function properly.

As shown in FIG. 3, the housing 36 is designed to mount the pump source 22 proximate the first side surface 24 of the microresonator cavity. Although the pump source can be mounted in a number of different manners, the housing of one embodiment includes a cap 37 in which the pump source is mounted, such as with an epoxy. By securing the cap to the remainder of the housing, the pump source can be appropriately aligned with the active gain medium 12. As also shown in FIG. 3, the housing can include a window 40 separating the pump source from the microresonator such that the portion of the housing in which the microresonator resides can be effectively sealed, thereby protecting the microresonator from environmental and other deleterious conditions. In order to permit the pump source to effectively deliver pump signals to the active gain medium 12, however, the window separating the pump source from the microresonator is designed to be transmissive to signals having the wavelength of the pump signals. For example, the window can be a sapphire window that is coated with a plurality of dielectric layers, having respective indices of refraction that are tailored so as to reflect little, if any, of the signals having the wavelength of the pump signals, such as 808+/−3 nanometers in one embodiment.

As will be apparent to those skilled in the art, the microlaser 10 of the present invention is extremely advantageous in its ability to deliver pulses having longer pulse widths and greater pulse energies than the pulses delivered by conventional end-pumped microlasers of substantially the same size. As such, the microlaser of the present invention is advantageous for a variety of applications, including marking, micromachining, LIDAR and other ranging applications.

As described above, the microresonator can be fabricated in a variety of manners including epitaxially growing either the active gain medium 12 or the passive Q-switch material 14 upon the other, diffusion bonding the active gain medium and the passive Q-switch or joining the active gain medium and the passive Q-switch by optical contact. In one particularly advantageous embodiment, the active gain medium is grown, such as by liquid phase epitaxy, upon the passive Q-switch material. As such, the atomic percentage of the dopant in the active gain material can be significantly greater than the atomic percentage of dopant in comparable active gain material grown according to Czochralski techniques. For example, the active gain medium of Nd doped YAG that is epitaxially grown upon a layer of tetravalent chrome doped YAG that serves as the passive Q-switch material can have an atomic percentage of Nd that is between about 2 atomic percent and 3 atomic percent, in comparison to Nd doped YAG having an atomic percentage of Nd of 0.8% to 1.4% if grown by a conventional Czochralski technique.

Figure 4:
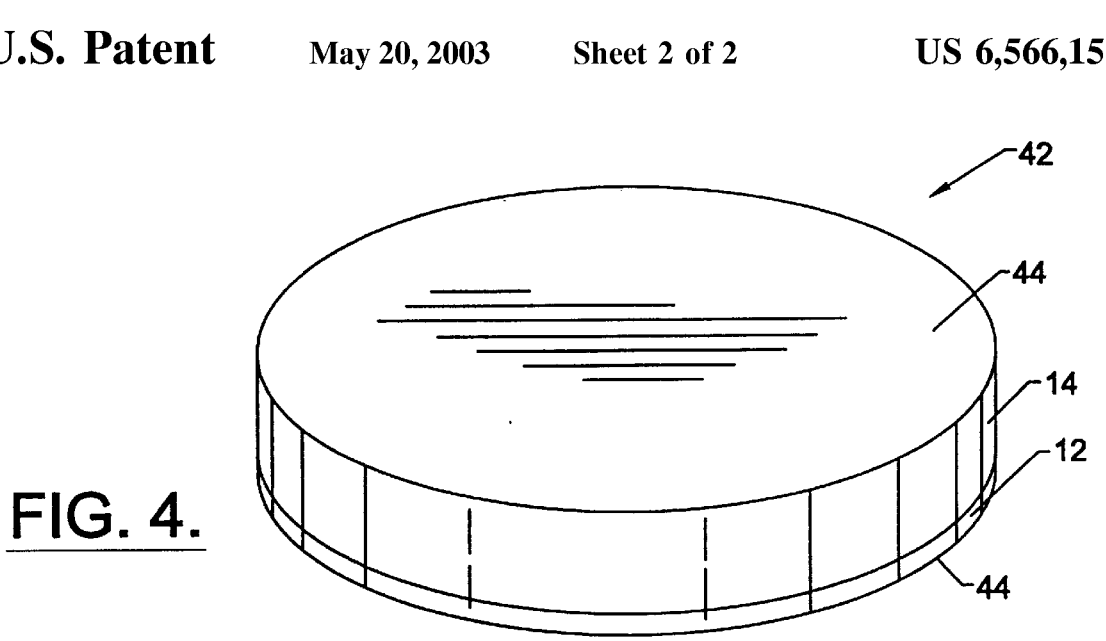
FIG. 4 is a perspective view of a composite structure comprised of a passive Q-switch material and an active gain medium fabricated according to a method of one embodiment of the present invention.

According to this advantageous fabrication technique, a layer of passive Q-switch material 14 such as tetravalent chrome doped YAG is initially provided. Although the layer of passive Q-switch material can be provided in a variety of forms, the layer of passive Q-switch material is typically provided as a relatively thin wafer which, in one embodiment, has a thickness of about 500 microns. The active gain medium 14 is then grown, preferably by liquid phase epitaxy, upon the layer of the Q-switch material to form the composite structure 42 shown in FIG. 4 having opposed major surfaces 44. While the active gain medium can be grown so as to have a variety of thicknesses, the thickness of the active gain medium is typically between about 2 and 4 millimeters, and in one embodiment, is 2.2 millimeters.

Figure 5:
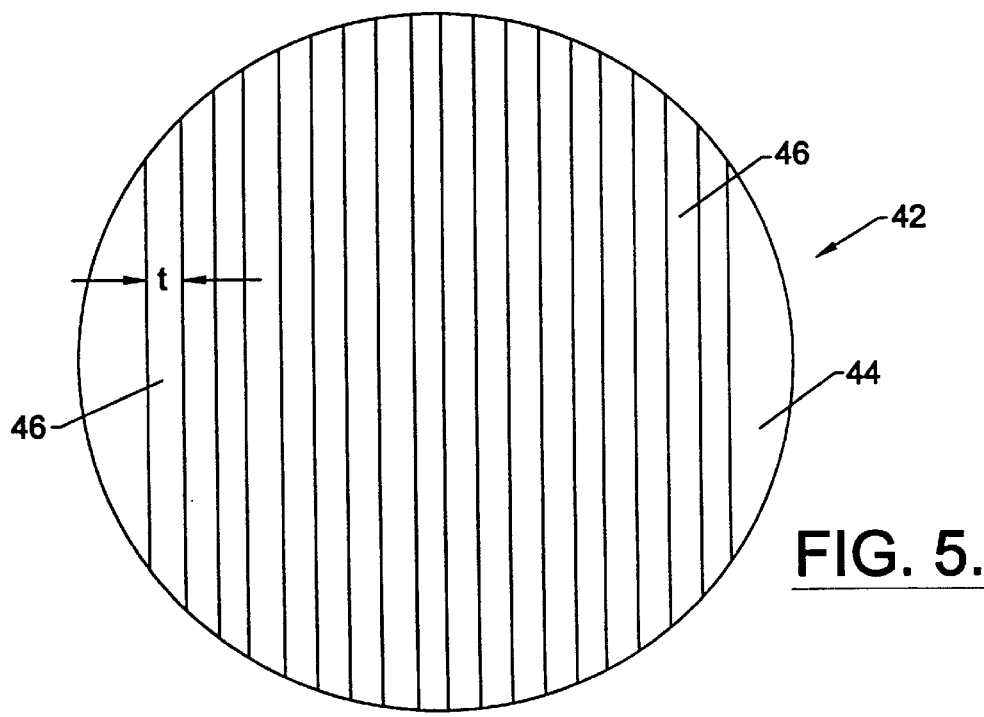
FIG. 5 is a plan view illustrating the composite structure of FIG. 3 being divided into a plurality of bars according to the method of one embodiment of the present invention.
Figure 6:
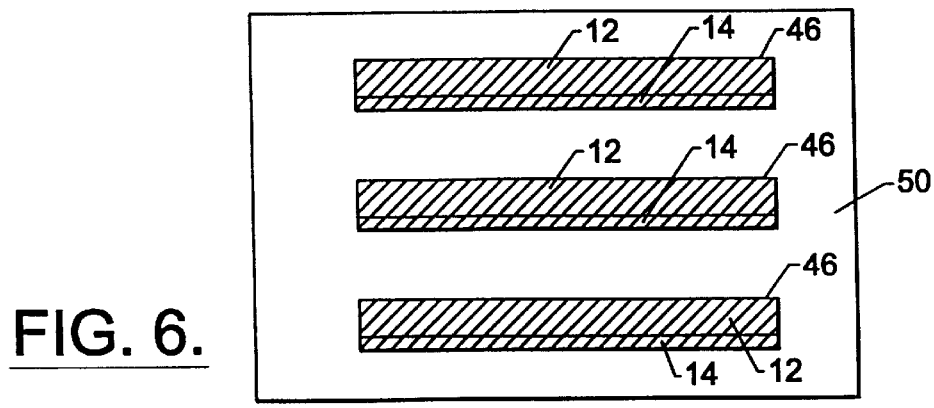
FIG. 6 is a plan view illustrating a plurality of bars being cut at a nonorthogonal angle α relative to the opposed major surfaces according to the method of one embodiment of the present invention.

In the illustrated embodiment, the composite structure 42 is then cut into a plurality of lengthwise extending bars 46. See FIG. 5. While the composite structure can be cut in a variety of manners without departing from the spirit and scope of the present invention, the composite structure is typically mounted to a glass plate with a layer of wax. In addition, the exposed major surface 44 of the composite structure that is opposite the glass plate is also typically coated with wax to prevent shattering of the composite structure during the cutting operation. After lacing the glass plate upon a vacuum chuck, the composite structure is cut into a plurality of bars with a diamond-tipped saw. While the bars can have a variety of thicknesses, the bars of one embodiment has a thickness designated t in FIG. 5 of about 1.2 millimeters. After removing the wax, each bar is laid on its side and mounted to another glass plate 50 with an optical adhesive, such as Norland optical adhesive grade 65, as shown in FIG. 6. After placing the glass plate upon a vacuum chuck, the bars are cut at a nonorthogonal angle α relative to the opposed major surfaces to thereby form a plurality of passively Q-switched microlasers 10. While the bars can be cut at a variety of angles as described above, the nonorthogonal angle α is typically between about 30° and 35° and, more typically is about 30.9°.

After removing the optical adhesive, the first side surface 24 of each resulting microlaser 10 can be coated with an antireflection coating 26 for permitting signals having the wavelength of the pump signals to be received by the active gain medium 12 without being reflected from the first side surface as described above. In addition, the second side surface 30 of each resulting microlaser, opposite the first side surface, can also be coated with a reflectance coating 32 for reflecting signals having the wavelength of the pump signals. Although the antireflection coating and the reflectance coating can be formed in a variety of manners, these coatings are typically formed by depositing a series of dielectric layers upon the respective side surfaces as known to those skilled in the art. In addition, the third and fourth opposed side surfaces of the respective microlaser can be roughened, such as by finely grinding the third and fourth opposed side surfaces 34, to thereby diffuse light.

In the embodiment in which the first and second reflective surfaces 18, 20 that define the opposed ends of the microresonator cavity are deposited upon the opposed end faces 16 of the microresonator, the method of this advantageous embodiment also contemplates depositing the first reflective surface that is highly reflective for signals having the predetermined lasing wavelength upon one end face 16 of the microresonator and depositing the second reflective surface that is only partially reflective for signals having the predetermined lasing wavelength upon the other end face such that the resulting microlasers are capable of emitting signals of the predetermined lasing wavelength via the second reflective surface. As described above, the first highly reflective surface is typically deposited upon the end face proximate the active gain medium 12 and the second partially reflective surface is typically deposited upon the other end face proximate the passive Q-switch 14. As described above, the first and second reflective surfaces are typically formed by depositing a series of dielectric layers upon the opposed end faces of the microresonator that have respective indices of refraction tailored to provide the appropriate reflectivity properties in a manner known to those skilled in the art. However, the first and second reflective surfaces can be formed according to other techniques without departing from the spirit and scope of the present invention while the opposed end faces of the microlaser can be coated prior to cutting the composite structure 42 into a number of bars 46, the opposed end faces of the microlaser are typically coated after the individual microlasers have been formed.

By constructing the microlaser 10 according to the foregoing method, the active gain medium 12 can be more heavily doped than the active gain mediums of some conventional microlasers that are grown according to a Czochralski technique. As such, the output pulses provided by the resulting microlaser can have pulse energies and power levels that are even further increased relative to the output pulses provided by conventional microlasers. As described in detail above, the microlasers of the present invention that are fabricated according to the foregoing method or that are fabricated in other manners, such as by diffusion bonding, are also particularly advantageous since the microlasers provide output pulses having a greater pulse width or pulse duration and greater pulse energies and average power levels as a result of the side pumping of the microresonator and the zig-zag resonation pattern supported by the microresonator in comparison to conventional end-pumped microlasers of substantially the same physical size. As such, the resulting microlaser of the present invention is particularly advantageous for a wide variety of applications that are demand output pulses having increased energy levels, average power levels and pulse durations.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of fabricating a plurality of Q-switched microlasers comprising:
   disposing one of an active gain medium and a layer of Q-switch material upon the other to thereby form a composite structure having opposed major surfaces; and
   cutting the composite structure at a nonorthogonal angle α relative to the opposed major surfaces to thereby form the plurality of Q-switched microlasers, wherein each Q-switched microlaser defines a longitudinal axis and has opposed end faces that are disposed at the nonorthogonal angle a with respect to the longitudinal axis.

2. A method according to claim 1 wherein said disposing step comprises growing the layer of Q-switch material upon the active gain medium.

3. A method according to claim 1 wherein said disposing step comprises growing the active gain medium upon the layer of Q-switch material.

4. A method according to claim 1 wherein said disposing step comprises diffusion bonding the active gain medium and the layer of Q-switch material.

5. A method according to claim 1 wherein said disposing step comprises joining the active gain medium and the layer of Q-switch material.

6. A method according to claim 1 further comprising dividing the composite structure into a plurality of bars, and wherein said cutting step comprises cutting a respective bar of the composite structure at the nonorthogonal angle α relative to the opposed major surfaces to thereby form the plurality of Q-switched microlasers.

7. A method according to claim 1 wherein said cutting step comprises cutting the composite structure at an angle α that is between about 30° and about 35° relative to a line perpendicular to the opposed major surfaces.

8. A method according to claim 1 further comprising coating a first side surface of a respective microlaser with an antireflection coating for permitting pump signals within a predetermined range of wavelengths to be received by the active gain medium without being reflected from the first side surface, wherein said coating step follows said cutting step.

9. A method according to claim 8 further comprising coating a second side surface of the respective microlaser, opposite the first side surface, with a reflectance coating for reflecting the pump signals, wherein said coating step follows said cutting step.

10. A method according to claim 9 further comprising roughening third and fourth opposed side surfaces of the respective microlaser to thereby diffuse light, wherein said roughening step follows said cutting step.

11. A method according to claim 1 further comprising coating the opposed end faces of the microlaser with first and second reflective surfaces, respectively, following said cutting step, wherein the first reflective surface is highly reflective for laser signals having a predetermined wavelength while the second reflective surface is partially reflective for laser signals having the predetermined wavelength such that the resulting microlaser is capable of emitting laser signals of the predetermined wavelength via the second reflective surface.

12. A method according to claim 11 wherein coating one end face of the microlaser with the first reflective surface comprises coating the end face of the microlaser that is formed by the active gain medium with the first reflective surface, and wherein coating the other end face of the microlaser with the second reflective surface comprises coating the end face of the microlaser that is formed by the Q-switch material with the second reflective surface.

* * * * *